Feb. 16, 1932.   C. HOTCHKISS   1,844,936

METHOD OF APPLYING CLOSURES TO GLASS CONTAINERS

Filed Jan. 7, 1928

INVENTOR.
Clifford Hotchkiss
BY
ATTORNEY.

Patented Feb. 16, 1932

1,844,936

UNITED STATES PATENT OFFICE

CLIFFORD HOTCHKISS, OF MILWAUKEE, WISCONSIN, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

METHOD OF APPLYING CLOSURES TO GLASS CONTAINERS

Application filed January 7, 1928. Serial No. 245,238.

This invention relates in general to a method of welding or fusing and sealing metal and glass and while adapted for universal application is especially designed and adapted for use in applying closures or other fittings such as metal caps or the like to solid glass articles such as glass rods or to hollow containers of glass or of other materials or substances rigid at ordinary temperatures but plastic at suitably higher temperatures. The method may be employed with advantage for securing and sealing a metal cap on a tube or other similar container of glass.

Heretofore, in constructing mercury switches, mercury lamps, X-ray tubes, and various other similar or diverse articles, it has been difficult to close and effectively seal the ends or openings of such tubes or containers by means of metal caps, or the like, because it was extremely difficult to obtain in any known manner a proper seal between the glass and the metal cap.

The present invention proposes a novel method by which a hollow glass container or a solid glass article is sealed to a metal cap, closure, or other metallic fitting or part throughout the entire engaging area of the glass and metal. In other words, a seal is had throughout a substantial area and not merely around a line of contact. Further, the glass and the metal are permanently welded and united in a secure and durable manner, this action being enhanced by virtue of the fact that certain of the substances or elements in the glass are chemically combined with the metal or metallic oxides of the cap.

In its broadest aspect the present method consists in securing and sealing a metal member to an article or part constituted of glass or of any material rigid at ordinary temperatures but plastic at suitably higher temperatures by subjecting the assembly to the action of centrifugal force and simultaneously heating to a condition of suitable plasticity the portion of the glass article engageable with the metal member.

In practicing this method in connection with the application of a metal cap to a glass tube, the metal cap is fitted on one end of the glass tube and the tube is then rotated in any suitable manner as for instance, by clamping the tube in a chuck carried by the head-stock of a lathe. The cap and consequently the portion of the tube located therein is then subjected to the action of the heat by causing flames or jets to play upon the peripheral portion of the cap. The cap is heated up to a red heat and the portion of the tube within the cap is heated by conduction to a condition of suitable plasticity in which condition such portion of the tube responds to the action of centrifugal force and is displayed outwardly into intimate contact with the heated cap. This effects a permanent union or weld between the cap and the portion of the tube contained therein and consequently forms a seal over the entire area of the portion of the tube located within the cap. These are the essential features of the method and commercial articles may be constructed in this way. Under some conditions it may be desirable to supplement this basic method by additional steps in the nature of refinements. One of these additional steps consists in holding the cap against transverse deflection during the rotation and heating thereof. This is not essential to the process but has material advantages in that it aids in precluding undesirable distortion of the end structure of the tube. Of course, only the portion of the glass tube within the cap is heated and so there is no great tendency to transverse displacement but any tendency that may exist can be counteracted in this way. Another refinement consists in protecting the major portion of the tube or container from the action of heat, that is, confining the heat to the cap and to the glass contained therein by the use of a suitable shield. And during the capping operation the glass may be suitably worked.

Figure 1:
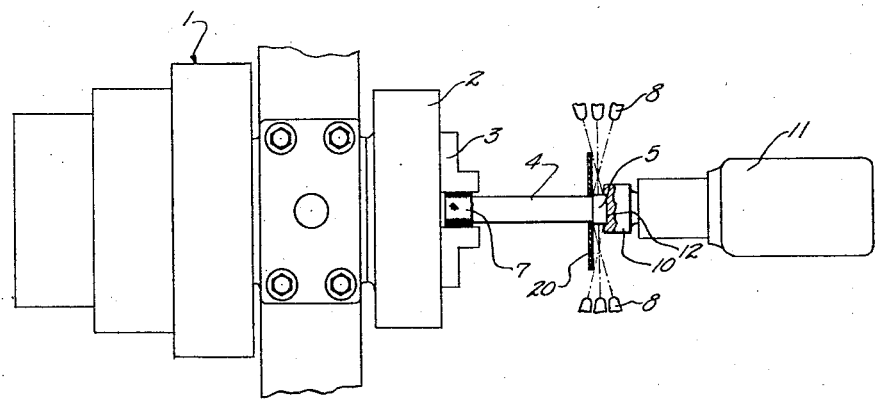
Figure 1 illustrates diagrammatically one form of machine for carrying out the method constituting the present invention.

Referring to the drawings, the numeral 1 designates generally a portion of a lathe illustrated diagrammatically and which may be of conventional construction. The head stock 2 of the lathe is provided with a chuck 3. In the application of the method shown a glass tube 4 has a metal cap designated generally at 5 fitted on one end, the peripheral portion or flange 6 of the cap fitting snugly around the periphery of one end of the tube 4. The tube or container 4 may be of any appropriate composition. The cap 5 may be of iron, nickel, tungsten, or any suitable metal. Where the tube is to be exhausted to vacuum, non-porous metal, such as nickel rolled in vacuum, is employed. In some instances it may be made of copper coated with nickel or the like. The end of the tube 4 remote from the cap 5 may be wrapped with a few turns of cloth or other cushioning material designated at 7 and then clamped in the chuck 3. In this way the lathe is used to rotate the tube at the desirable speed. Satisfactory results have been obtained by rotating the tube at the speed of 900 revolutions per minute but, of course, this speed may be varied as may be desirable. With the assembled cap and tube rotating in this manner flame jets are brought to play on the cap, the jets of flame issuing from the nozzles designated diagrammatically at 8, and an impinging on the cap 5, as indicated in Figure 1. With this arrangement the cap 5 is uniformly and evenly heated to a red heat and by conduction the underlying portion of the tube 4 is heated to a state of suitable plasticity. As the tube is rapidly rotating, centrifugal force displaces outwardly the somewhat soft and plastic heated end of the tube 4, this heated end being sufficiently plastic to respond to the influence of the centrifugal force and to be displaced outwardly thereby into intimate contact with the inner surface of the flange 6 of the cap. The tube 4 is not, however, so soft as to lose its form or to be distorted to any extent but it is sufficiently soft to enlarge and flow, as required, into intimate contact with the flange 6 of the cap 5. Of course, at this time, the flange 6 is red hot and this aids in the union between the parts. In fact, there is, to a certain extent, a chemical combination between certain of the elements of the glass and the metallic oxides on the surface of the cap, thus providing a very secure and permanent weld and seal. After this operation has been carried out the tube 4 is removed from the lathe and allowed to cool down.

At times, the cap 5 has shown a tendency to be displaced transversely relative to the axis of the tube 4 but this may be prevented in various ways should it be desirable to do so. Broadly, the prevention of this transverse deflection of the cap consists in the holding of the cap against transverse deflection while permitting rotation thereof. As shown in Figure 1, such holding may be effected by providing a socket 10 mounted in the tail stock 11 of the lathe and having a recess which loosely fits about the extreme outer edge of the cap. If desired, this socket 10 may be rotated in synchronism with the head stock or it may so loosely embrace the cap as to permit the same to rotate while preventing transverse deflection.

Figure 2:
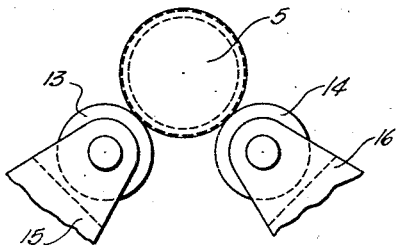
Figure 2 is a fragmentary view in end elevation illustrating diagrammatically a different form of means which may be employed for preventing transverse displacement of the cap and of the end portion of the glass tube contained therein.
Figure 3:
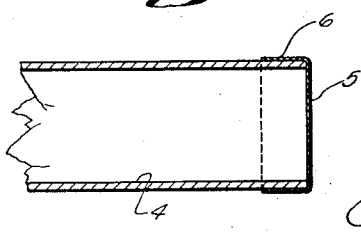
Figure 3 is a fragmentary view in central longitudinal section showing a portion of the glass tube fitted with a metal cap to be sealed thereto.

Figure 2 illustrates the use of a pair of rollers designated at 13 and 14 and mounted in suitable supporting members 15 and 16. These rollers also prevent transverse deflection of the cap 5 while permitting free rotation thereof.

Moreover, the rollers 13 and 14 and the socket 10 may be employed simultaneously, if desired.

It is desirable to localize the heating of the glass to that portion received within the cap 5. This concentration of the heat on such portion of the glass is effected in a practical way by localizing the flames on the cap, but, if desired, this object may be furthered by employing shield 20 suitably supported in fixed position and having an opening receiving the tube 4 loosely so that the tube 4 may freely rotate. However, the shield extends close down to the flange 6 of the cap 5 and effectively prevents the flames or any of them from playing on the glass, the shield serving to confine the action of the flames to the cap 5.

The cap or other metal element may be heated in any appropriate fashion and the invention contemplates induction heating of the metallic element.

While the metallic element and the glass article are being united by the combined action of heating and centrifugal force the glass article may be worked. Thus, with a tube the glass adjacent the edge of the flange of the cap may be displaced inwardly under the influence of suction exerted through the open end of the tube or under the influence of rollers similar to rollers 13 and 14 which press against the glass to displace it inwardly as it becomes plastic. In such event, the shield 20 is omitted and the heating allowed to progress along the glass beyond the cap to the extent that may be desirable. Similarly, the glass tube or other article may be displaced outwardly adjacent the flange 6 of the cap 5 by supplying compressed air into the tube. Air pressure within the tube will cause the glass to bulge outwardly where it is heated near the edge of the flange of the cap. In applying pressure or suction to the interior of the tube, an air-line may be led in through the head stock of the lathe axially and may have a swivelled connection inserted through the open end of the tube and appropriately packed thereto. Of course, the air-line remains stationary but its swivelled end rotates with the tube.

The invention claimed is:

1. The method of securing and sealing a metallic element to an article of material rigid at ordinary temperatures but plastic at suitably higher temperatures which consists in rotating the assembly, heating the metallic element and the portion of the article engaged therewith, and maintaining the metallic element and the associated portion of the article against transverse deflection.

2. The method of securing and sealing a metallic element to an article of material rigid at ordinary temperatures but plastic at suitably higher temperatures which consists in rotating the assembly, heating the metallic element and also the portion of the article engaged therewith, and shielding the major portion of the article from the action of the heat.

3. The method of securing and sealing a metallic element to a glass article which consists in rotating the glass article with the metallic element assembled therewith, heating the metallic element and also the glass article by conduction, maintaining the metallic element and the associated portion of the glass article against transverse deflection and shielding all of the glass article except that within the cap from the action of the heat.

In witness whereof, I hereto affix my signature.

CLIFFORD HOTCHKISS.